(12) United States Patent
Liacouras et al.

(10) Patent No.: US 11,540,900 B2
(45) Date of Patent: Jan. 3, 2023

(54) DENTAL RIDGE AUGMENTATION MATRIX WITH INTEGRATED DENTAL IMPLANT SURGICAL DRILL GUIDE SYSTEM

(71) Applicants: Peter Liacouras, North Potomac, MD (US); Michael Yang, Iwakuni (JP)

(72) Inventors: Peter Liacouras, North Potomac, MD (US); Michael Yang, Iwakuni (JP)

(73) Assignee: The United States of America as Represented by the Secretary of the Navy, Arlington, VA (US)

( * ) Notice: Subject to any disclaimer, the term of this patent is extended or adjusted under 35 U.S.C. 154(b) by 679 days.

(21) Appl. No.: 16/401,273

(22) Filed: May 2, 2019

(65) Prior Publication Data
US 2019/0336245 A1 Nov. 7, 2019

Related U.S. Application Data

(60) Provisional application No. 62/666,557, filed on May 3, 2018.

(51) Int. Cl.
*A61C 1/08* (2006.01)
*A61C 13/00* (2006.01)
*A61C 13/01* (2006.01)

(52) U.S. Cl.
CPC .......... *A61C 1/084* (2013.01); *A61C 13/0004* (2013.01); *A61C 13/01* (2013.01)

(58) Field of Classification Search
CPC ..... A61C 1/084; A61C 13/0004; A61C 13/01; A61C 13/04; A61C 13/02; A61B 17/17
See application file for complete search history.

(56) References Cited

U.S. PATENT DOCUMENTS

| 2,788,684 | A | * | 4/1957 | Scharf | B23B 49/02 |
| | | | | | 408/72 R |
| 4,624,673 | A | | 11/1986 | Meyer | |
| 5,015,183 | A | * | 5/1991 | Fenick | A61C 1/084 |
| | | | | | 433/76 |
| 5,388,933 | A | * | 2/1995 | Dunbar | B25B 27/18 |
| | | | | | 408/80 |
| 5,989,025 | A | | 11/1999 | Conley | |
| 6,099,313 | A | | 8/2000 | Dorken et al. | |
| 6,244,868 | B1 | | 6/2001 | Schappert | |
| 6,394,807 | B2 | | 5/2002 | Robinson | |
| 6,402,518 | B1 | | 6/2002 | Ashman | |

(Continued)

FOREIGN PATENT DOCUMENTS

FR     3037945 A1    12/2016
KR   20110037542 A    4/2011

(Continued)

OTHER PUBLICATIONS

Jensen, O. et al. Int. J. Oral Maxillofac. Implants, 2014; 29:e103-e105 ,vol. 29, No. 1, 2014, e103-e105.

(Continued)

*Primary Examiner* — Nicholas D Lucchesi
(74) *Attorney, Agent, or Firm* — Ning Yang

(57) ABSTRACT

The subject matter of the instant invention relates to a dental implant surgical apparatus and system comprising a customized dental ridge augmentation matrix and one or, optionally, a plurality of dental implant surgical drill guides, and methods of use thereof.

24 Claims, 6 Drawing Sheets

(56) References Cited

U.S. PATENT DOCUMENTS

| | | | |
|---|---|---|---|
| 6,626,667 B2 | 9/2003 | Sussman | |
| 6,971,877 B2* | 12/2005 | Harter | A61C 1/084 433/75 |
| 6,997,707 B2* | 2/2006 | Germanier | A61C 8/0048 433/75 |
| 7,104,795 B2* | 9/2006 | Dadi | A61C 1/084 433/72 |
| 7,172,422 B1 | 2/2007 | Essiger | |
| 7,322,821 B1* | 1/2008 | Lin | A61C 1/084 433/201.1 |
| 7,621,744 B2* | 11/2009 | Massoud | A61B 17/1688 623/17.17 |
| 7,753,914 B2* | 7/2010 | Ruhling | A61B 17/1615 606/102 |
| 7,905,726 B2 | 3/2011 | Stumpel | |
| 7,934,929 B2* | 5/2011 | Better | A61C 19/06 433/173 |
| 7,942,668 B2* | 5/2011 | Brajnovic | A61C 1/084 433/76 |
| 8,038,440 B2* | 10/2011 | Swaelens | A61C 1/084 433/76 |
| 8,087,934 B2* | 1/2012 | Duncan | A61C 8/0089 433/76 |
| 8,157,563 B2* | 4/2012 | Brajnovic | A61C 1/084 433/75 |
| 8,262,665 B2* | 9/2012 | Massoud | A61B 17/1688 623/17.17 |
| 8,398,643 B2* | 3/2013 | Gordils Wallis | A61C 8/0089 606/82 |
| 8,485,820 B1 | 7/2013 | Ali | |
| 8,535,055 B2* | 9/2013 | Katz | A61C 1/084 433/196 |
| 8,540,510 B2* | 9/2013 | Brajnovic | A61C 1/085 433/173 |
| 8,651,866 B2 | 2/2014 | Bulard et al. | |
| 8,741,196 B2* | 6/2014 | McCracken | B23B 49/02 264/479 |
| 8,777,613 B2* | 7/2014 | Wolf | A61C 8/0089 433/76 |
| 8,858,228 B2* | 10/2014 | Katz | A61C 8/0089 433/196 |
| 8,899,981 B2 | 12/2014 | Collins et al. | |
| 8,899,982 B2 | 12/2014 | Damstra et al. | |
| 8,986,381 B2 | 3/2015 | Freilich et al. | |
| 9,011,148 B2* | 4/2015 | Dolfi | A61C 1/085 433/213 |
| 9,017,406 B2 | 4/2015 | Seiler | |
| 9,050,665 B2* | 6/2015 | Greenberg | B23B 47/28 |
| 9,066,771 B2 | 6/2015 | Collins et al. | |
| 9,687,322 B2* | 6/2017 | Carmichael | A61C 8/0024 |
| 11,059,107 B2* | 7/2021 | Lee | A61C 1/084 |
| 11,219,511 B2* | 1/2022 | Berckmans, III | A61C 13/34 |
| 2001/0012607 A1 | 8/2001 | Robinson | |
| 2004/0024466 A1 | 2/2004 | Heerklotz | |
| 2004/0044413 A1 | 3/2004 | Schulter | |
| 2004/0054415 A1 | 3/2004 | Schulter | |
| 2006/0008773 A1 | 1/2006 | Liao | |
| 2008/0176187 A1 | 7/2008 | Stumpel | |
| 2008/0228270 A1 | 9/2008 | Hall | |
| 2010/0291508 A1 | 11/2010 | Jensen | |
| 2011/0159455 A1 | 6/2011 | Stumpel | |
| 2015/0359612 A9 | 12/2015 | Boiangiu | |

FOREIGN PATENT DOCUMENTS

| | | |
|---|---|---|
| WO | 2011087794 A1 | 7/2011 |
| WO | 2012145223 A1 | 10/2012 |
| WO | 2013096592 A1 | 6/2013 |
| WO | 2013163719 A1 | 11/2013 |

OTHER PUBLICATIONS

International Search Report and Written Opinion for Application No. PCT/US2019/030331 dated Jul. 22, 2019.
Rodella, L. et al., Int. J. Biomed. Sci. Jun. 2011; 7(2):81-88.
Ricci, L. et al., J. Periodontology, Sep. 2013; 84(9): 1234-1242 (abstract).
Rakhmatia, Y.D. et al., J. Prosthodontic Res. 57 (2013) 3-14.
Ramasamy, M. et al., J. Pharm. Bioallied Sci. Jun. 2013; 5(Suppl1):S98-S102.
Funato, A. et al., Int. J. Periodontics Restorative Dent. 2013; 33:437-445.
Guze, K. et al., Int. J. Periodontics Restorative Dent. 2013; 33:611-617.
Connors et al., Int J Periodontics Restorative Dent 2016;36:707-714.

* cited by examiner

DENTAL RIDGE AUGMENTATION MATRIX WITH INTEGRATED DENTAL IMPLANT SURGICAL DRILL GUIDE SYSTEM

CROSS REFERENCE TO RELATED APPLICATIONS

The present application claims the benefit of U.S. Provisional Patent Application No. 62/666,557 filed May 3, 2018, the entire contents of which is incorporated by reference herein.

FIELD OF THE INVENTION

The subject matter of the instant invention relates to an apparatus comprising a customized dental ridge augmentation matrix having an integrated dental implant surgical drill guide system, and methods of use thereof.

BACKGROUND OF THE INVENTION

Dental implants are well known components of dental surgery that are used to support various dental prostheses by anchoring the prosthesis to the bone of the jaw or skull of the subject, indeed, for many people, dental implants are a practical solution to the problem of missing teeth. In fact, for some subjects, a missing tooth may be replaced in a single day. In some cases, however, abnormal tooth loss can result in jaw bone defects from adverse healing of an extraction socket, e.g., a subject seeking a dental implant may present with a deficient alveolar ridge. In such cases, due to the lack of supporting bone structure, dental implants at conventional diameters are not possible without first augmenting the osseous anatomy in the subject using bone grafts.

Various methods exist for guided bone regeneration in implant dentistry. In a particular method, bone graft materials are placed in the jaw and metal appliances are placed around the area to contain and protect the bone graft materials during a period of bone regrowth. Oral surgical appliances developed for such use include thin protective mesh shells made of a biocompatible metal such as titanium. See, e.g., Jensen, et al., Int J Oral Maxillofac Implants, Vol 29, No. 1, 2014, e103-e105. Thus, conventional methods of implant dentistry can include first performing hard tissue augmentation surgery, waiting a suitable period of time to permit bone growth, and then performing one or more subsequent surgical procedures to remove any space maintenance device over the bone graft, place the dental implant in the newly formed bone, and attach any required abutment and prosthesis, e.g., a crown, bridge, or denture.

One of skill in the art will appreciate that the conventional placement of dental implants such as detailed above can be complicated by space constraints in the oral cavity. Thus, surgical drill guides are often used in conjunction with conventional implant drilling systems to direct the placement and angle of the drill and thus help ensure proper placement of the dental implant. Conventional guided implant surgery protocols typically use computer-aided designed and/or computer-aided manufactured (CAD/CAM fabricated) surgical guides to allow positioning of implant osteotomies of sequentially increasing diameter to prepare implant drill osteotomies. For stability, such surgical drill guides are conventionally secured to oral mucosa, bone and/or teeth in the subject. The major drawback of conventional tooth-borne implant surgical guides is that they can only be used when there are adjacent teeth on either side of the implant site. In addition, osseous level implant surgical guides require additional fixation using pins into the surgical site, which increases surgical time and morbidity.

Notwithstanding the benefits of existing technology, the placement of dental implants can be an inconvenient, time consuming process involving multiple clinical appointments. As such, there currently remains a need for improved methods and devices for promoting the reconstruction of oral osseous anatomy and surgical placement of dental implants in a subject in need thereof. In particular, improved methods and devices that would permit the simultaneous surgical placement of bone augmentation matrix materials and dental implants are desired.

SUMMARY OF THE INVENTION

In a first aspect, the invention relates to an apparatus for simultaneous surgical placement of an intraoral bone graft and a dental implant in a subject in need thereof; said apparatus comprising a customized ridge augmentation matrix and one or more dental implant surgical drill guides, wherein the customized ridge augmentation matrix is custom configured to the subject's anatomy prior to the surgical placement to provide space maintenance for the intraoral bone graft; wherein the dental implant surgical drill guide comprises a drill port that can receive and guide an implant osteotomy drill; and wherein the dental implant surgical drill guide may be articulated with and stably retained by the customized ridge augmentation matrix in the subject.

In additional aspects, the subject matter of the instant invention relates to a dental implant surgical system comprising a customized dental ridge augmentation matrix and one or, optionally, a plurality of dental implant surgical drill guides, in various embodiments as described herein, and methods of use thereof.

In a particular embodiment, the customized ridge augmentation matrix comprises one or more lateral wings extending downward from an apex, and comprising an interior surface defining a cavity suitable to fit over said intraoral bone graft in said subject.

In a particular embodiment, at least a portion of the customized ridge augmentation matrix comprises a plurality of porous openings. In a particular embodiment, said porous openings range in size from about 1.0 mm to about 9.0 mm in diameter. In a particular embodiment, one or more of said plurality of porous openings may serve as a point of articulation with the dental implant surgical drill guide, a fixation screw port, a bone graft fill port, an implant access port, and/or a nutrient port.

In one embodiment, one or more of said plurality of porous openings is a nutrient port. In a particular embodiment, said nutrient port ranges in size from about 1.0 mm to about 3.0 mm in diameter.

In another embodiment, one or more of said plurality of porous openings is a fixation screw port designed to receive screws for securing the customized ridge augmentation matrix to the subject's osseous anatomy. In a particular embodiment, said fixation screw ports range in size from about 1.0 mm-3.0 mm in diameter. In a particular embodiment, said fixation screw ports are located on the lateral wings of the customized ridge augmentation matrix.

In another embodiment, one or more of said porous openings is a bone graft fill port. In a particular embodiment, said bone graft fill ports range in size from about 2.0 mm to about 6.0 mm in diameter.

In yet another embodiment, one or more of said plurality of porous openings is a point of articulation designed to receive pin-shaped projections of the dental implant surgical drill guide. In a particular embodiment, said porous opening designed to receive the pin-shaped projections is a nutrient port. In yet another embodiment, one or more of said plurality of porous openings is an implant access port designed to receive a dental implant. In a particular embodiment, said implant access port is located at the coronal aspect of the customized ridge augmentation matrix. In a particular embodiment, said implant access port is about 3.0 mm to about 9.0 mm in diameter. In a particular embodiment, the CRAM of the instant invention may comprise more than one implant access port, e.g., when a subject is in need of more than one dental implant in adjacent positions in the jaw.

In a particular embodiment, the apparatus of the invention comprises a dental implant surgical drill guide system comprising a plurality of dental implant surgical drill guides each comprising a different diameter drill port, and wherein said system is designed to allow sequential placement of increasing diameter implant osteotomy drills during surgical placement of an intraoral bone graft and a dental implant in a subject in need thereof.

In a particular embodiment, the drill port of the dental implant surgical drill guides are about 2 mm to about 7 mm in diameter. In another embodiment, the dental implant surgical drill guide are off-set programmed to a desired implant drill system.

In another particular embodiment, said dental implant surgical drill guides of the instant invention comprise an intaglio surface, and wherein one or more structural features of said intaglio surface are designed to physically engage and stably integrate the dental implant surgical drill guide at points of articulation on said customized ridge augmentation matrix in the apparatus.

In a particular embodiment, said one or more structural features of said intaglio surface comprise one or more pin-shaped projections designed to physically insert into one or more of said plurality of porous openings on said customized ridge augmentation matrix. In a particular embodiment, said dental implant surgical drill guides comprise a plurality of pin-shaped projections. In another embodiment, the dental implant surgical drill guides comprise 1, 2, 3, or 4 pin-shaped projections. In another embodiment, said pin-shaped projections are less than 2.0 mm in length and/or diameter. In a particular embodiment, the pin-shaped projections are about 0.5 mm-2.0 mm in length and/or diameter. In a particular embodiment, the pin-shaped projections are 1.5 mm in length and/or diameter. In another embodiment, said pin-shaped projections are designed to engage in corresponding nutrient ports of the CRAM.

In another embodiment, the dental implant surgical drill guides comprise a margin around the dental implant surgical drill guide that conforms to the coronal contour of the customized ridge augmentation matrix to provide stable integration therewith. In another embodiment, said dental implant surgical drill guides are custom configured dental implant surgical drill guides, and comprise one or more structural features designed to contact the osseous anatomy of the subject to provide enhanced stability of the apparatus in the subject. In a particular embodiment, the structural features are designed to directly contact the dentoalveolar osseous crest in the subject.

In one embodiment, the instant invention comprises one or more biocompatible materials that are structurally stable for the intended use. In a particular embodiment, the biocompatible material is selected from the group consisting of plastic, titanium, zirconia, zirconium oxide, acrylic, and a combination or alloy thereof. In a particular embodiment, the alloy is Ti6AlV4. In another particular embodiment, the material is substructure grade zirconia.

In another aspect, the invention relates to methods of simultaneously surgically placing an intraoral bone graft and a dental implant in a subject in need thereof, said method comprising use of the apparatus of the instant invention.

In another aspect, the invention relates to methods of simultaneous surgical placement of an intraoral bone graft and a dental implant in a subject in need thereof comprising use of a dental implant surgical system of the instant invention, said system comprising a customized ridge augmentation matrix and one or a plurality of dental implant surgical drill guides.

In a particular embodiment the invention relates to a method of simultaneously surgically placing an intraoral bone graft and a dental implant in a subject in need thereof, said method comprising a. creating a customized ridge augmentation matrix for the subject based on the subject's anatomy prior to the subject's surgical procedure;

b. creating one or more custom configured dental implant surgical drill guides for the subject based on the subject's anatomy and desired restoration prior to the subject's surgical procedure;

c. placing the customized ridge augmentation matrix into the subject during the subject's surgical procedure;

d. individually integrating said one or more custom configured dental implant surgical drill guides with the customized ridge augmentation matrix, and preparing one or more implant osteotomies in the subject comprising using said one or more custom configured dental implant surgical drill guides during the subject's surgical procedure;

e. placing a dental implant into said one or more implant osteotomies through the implant access port of the customized ridge augmentation matrix during the subject's surgical procedure;

f. placing one or more bone grafts in the subject through one or more ports of the customized ridge augmentation matrix during the subject's surgical procedure; and g. surgically closing the site of said intraoral bone graft and dental implant in the subject at the end of the subject's surgical procedure.

In a particular embodiment, the one or more bone grafts may be placed through one or more bone graft fill ports and/or through the implant access port of the customized ridge augmentation matrix.

In another particular embodiment, the plurality of custom configured dental implant surgical drill guides each comprises a different diameter drill port designed to allow sequential placement of increasing diameter implant osteotomy drills to create an osteotomy in the subject during said method.

In another embodiment, the method may be performed comprising the use of only one dental implant surgical drill guide.

In a particular embodiment, the custom configured dental implant surgical drill guide is designed to receive a surgical guide spoon or sleeve that allows use of one or more implant osteotomy drills. In one embodiment, the implant osteotomy drills are provided with commercially available guided surgery kits. In a particular embodiment, the method further comprises covering the customized ridge augmentation matrix and dental implant with a biocompatible membrane prior to closing. In a particular embodiment, the biocompatible membrane is resorbable.

DETAILED DESCRIPTION

Figure 1:
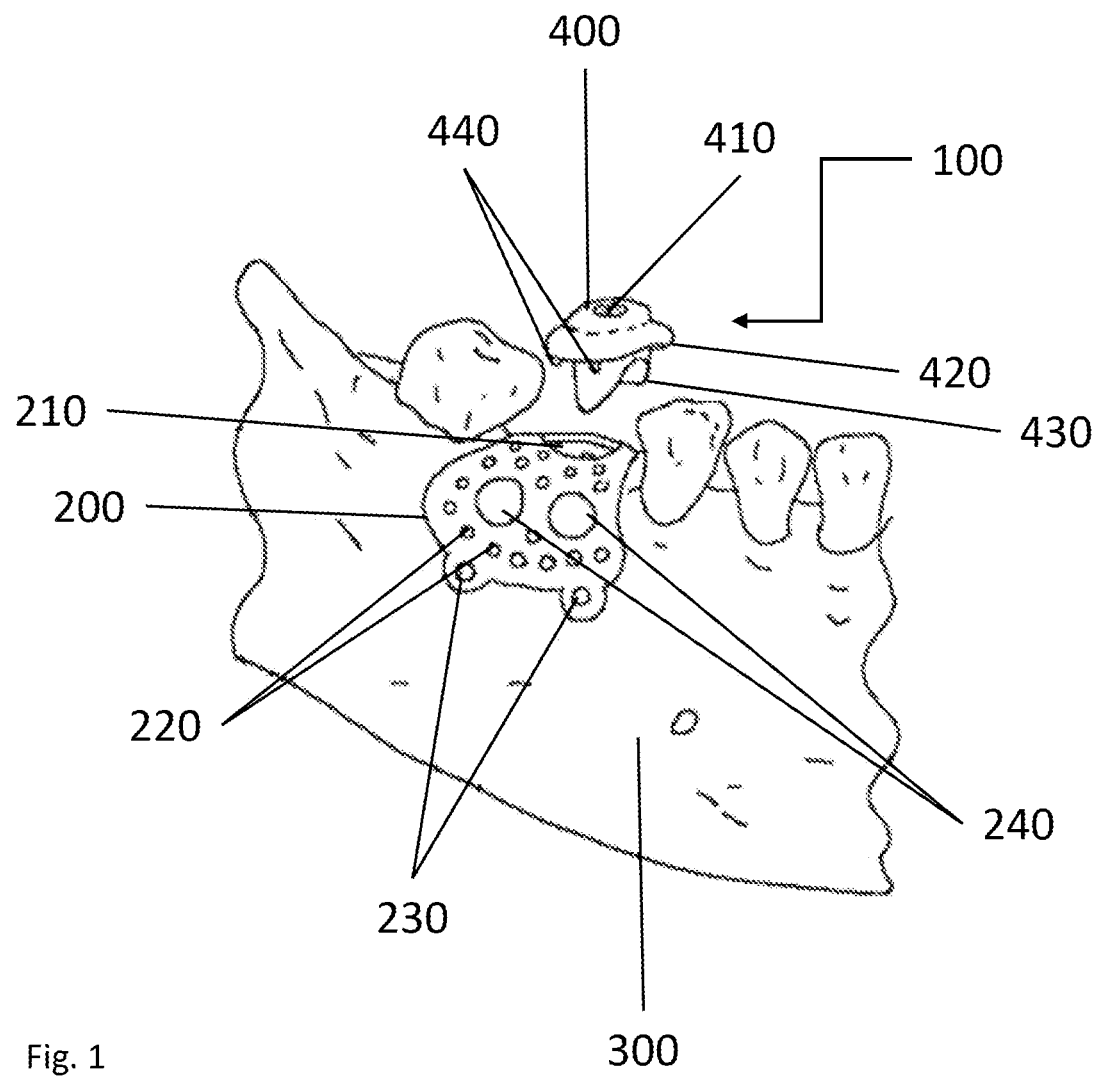
FIG. 1 depicts an isometric view of an embodiment of an apparatus of the instant invention 100 comprising a customized ridge augmentation matrix 200 placed on a section of mandible 300 with one example of a graded series of sequential customized implant surgical drill guides 400 illustrated above the customized ridge augmentation matrix 200. In a particular embodiment, an osteotomy and implant access port 410, margins 420, and contours of the underside 430, and intaglio surface pin-shaped projections 440 of the dental implant surgical drill guide 400 are depicted. Also depicted in this embodiment are a plurality of various sized porous openings on the customized dental ridge augmentation matrix 200, including a dental implant surgical drill guide access port 210, nutrient ports 220, fixation screw ports 230, and bone graft fill ports 240. Fixation screws are not depicted in this image.

While the specification concludes with the claims particularly pointing out and distinctly claiming the invention, it is believed that the present invention will be better understood from the following description.

Where applicable, all percentages and ratios used herein are by weight of the total composition unless otherwise indicated herein. All temperatures are in degrees Celsius unless specified otherwise. All measurements are made at 25° C. and normal pressure unless otherwise designated. The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include elements in addition to those recited in the claim, but only if the additional elements do not materially alter the basic and novel characteristics of the claimed invention.

All ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "a dental implant surgical drill guide" can mean at least one dental implant surgical drill guide, as well as a plurality of dental implant surgical drill guides, i.e., more than one dental implant surgical drill guide.

Where used herein, the term "and/or" when used in a list of two or more items means that any one of the listed characteristics can be present, or any combination of two or more of the listed characteristics can be present. For example, if an apparatus of the instant invention is described as containing characteristics A, B, and/or C, the apparatus can contain A feature alone; B alone; C alone; A and B in combination; A and C in combination; B and C in combination; or A, B, and C in combination. The entire teachings of any patents, patent applications or other publications referred to herein are incorporated by reference herein as if fully set forth herein.

As discussed briefly above, different methodologies of placing dental implants exist. In many cases, alveolar bone resorption requires the clinician to surgically perform bone graft procedures in a subject before a dental implant may be fixed in the jaw of the subject. Thus, one of skill in the art will appreciate that commercially available methodologies may require multiple clinical appointments which not only are inconvenient to the subject, but also increase the length of time the subject must wait to receive the functional and aesthetic benefits of restorative dentistry.

In contrast, it is contemplated herein that the apparatus and system of the instant invention provides an improvement over existing methods and devices used in the placement of bone grafts and dental implants by making possible the simultaneous grafting of a dental implant using a customized ridge augmentation matrix. (CRAM), while concurrently using dental surgical drill guides inserted through the CRAM as a means to guide the placement of the implant. Thus, the devices and methods of the instant invention have the potential to shorten dental implant treatment time as well as provide increased predictability of ideal implant placement through use of the CRAM. The invention also obviates the need for adjacent teeth to serve as a means of stabilization, and thus can be used in edentulous ridges and does not require additional fixation such as those used for bone level implant guides.

The stability and accuracy of the CRAM working in conjunction with dental implant surgical drill guides offers directionality as well as sequential drill sequences. Accordingly, in a particular embodiment, the apparatus of the instant invention comprises a CRAM and one or more custom configured dental implant surgical drill guides. As contemplated herein, use of one, or more than one sequential custom configured dental implant surgical drill guides, stably articulated with the CRAM according to the methods of the instant invention allows proper placement of the drill guides and implant without interference from any residual osseous structure within the CRAM, while at the same time offering directionality via its cylindrical structure.

One of skill in the art will appreciate that the dental implant surgical drill guides of the instant invention can be custom configured for each subject, and specifically for each implant site within the subject, using conventional methods including, but not limited to, using computer-aided design/computer-assisted manufacture (CAD/CAM) technology.

Moreover, one of skill in the art will appreciate that the treatment planning of the position of the implant in the subject depends on the subject's available bone and the position of the desired restoration. Indeed, the height of the implants, implant site, implant type, patient anatomy (e.g., dentoalveolar ridge) and guide articulation may vary depending on the patient. As used herein, "guide articulation" refers to how the custom dental implant surgical drill guides engage with the CRAM at points of articulation to achieve retention and stability, e.g., via the use of pins built into the drill guides that insert into corresponding pores, e.g., one or more nutrient ports, in the CRAM.

In a particular embodiment, the apparatus comprises a dental implant surgical drill guide system comprising a plurality of custom configured dental implant surgical drill guides each comprising a different diameter drill port, and wherein said system is designed to allow sequential placement of a graded series of increasing diameter implant osteotomy drills during the surgical placement of an intraoral bone graft and a dental implant in a subject in need thereof. It is also contemplated herein that the term "dental implant surgical drill guide system" includes but is not limited to a collection of dental implant surgical drill guides to be used by one of skill in the art for the sequential placement of a graded series of increasing diameter implant osteotomy drills during the surgical placement of a dental implant in a subject in need thereof. Such procedure may or may not comprise providing an intraoral bone graft to the subject.

Thus, a collection of drill guides of the instant invention may comprise a plurality of individual drill guides, each designed to comprise a different diameter drill port, to be used in series by one of skill in the art during a dental implant. Such collection of drill guides may comprise a series of increasing drill port diameters that are custom configured for each individual patient, or the collection may be designed to comprise a series of increasing standard diameters consistent with the use of commercially available implant osteotomy drills familiar to one of skill in the art. As discussed below, the use of surgical drill guide spoons or sleeves, if deemed necessary by the clinician, are also contemplated herein.

It is contemplated herein that one of skill in the art will appreciate that the apparatus of the instant invention comprising a CRAM and one or a plurality of dental implant surgical drill guides, may itself be considered a dental implant surgical system, and accordingly such term is also used herein to refer to the instant invention. The use of the term "dental implant surgical system" in this sense is not intended to be confused with the term "dental implant surgical drill guide system" as used herein to refer to the collection of surgical drill guides each comprising a different diameter drill port for use with a graded series of increasing diameter implant osteotomy drills.

As understood herein, a "subject in need thereof" is any organism requiring the implantation of one or more dental prostheses that may benefit from the use of the apparatus of the instant invention. These include, but are not limited to, human and non-human subjects, and also include subjects in need of guided bone regeneration around the implant.

One of skill in the art will appreciate that implant drills for use with the instant invention may comprise a feature for controlling the depth of the drill during use, e.g., a "stopper". Such "stoppers" are familiar to one of skill in the art. Accordingly, it is contemplated herein that the dental implant surgical drill guides of the instant invention may be designed to accommodate such drill stoppers.

In another embodiment, the custom configured dental implant surgical drill guide system may be designed to receive a surgical drill guide spoon or sleeve that allows use of one or more dental implant osteotomy drills, including, e.g., dental implant osteotomy drills that are included with commercially available guided surgery kits. Such kits are available from a variety of commercial vendors, including, e.g., BIOMET 3i (Palm Beach Gardens, Fla.); Nobel BioCare (Kloten, Switzerland); and BioHorizons (Birmingham, Ala.).

Notably, in contrast to prior art methods, the dental implant surgical drill guides are stabilized in the apparatus of the instant invention by being integrated with the CRAM that is used during the implant procedure. As contemplated herein, while it may be used, the apparatus of the instant invention does not require additional stabilization from adjacent structures or additional fixation from bone level implant guides. Accordingly, by allowing the simultaneous grafting of a dental implant using a CRAM while using the CRAM to guide the implant placement, the apparatus of the instant invention is projected to shorten total dental implant treatment time, decrease morbidity, and allow for simultaneous ideal placement of dental implant with guided bone regeneration around the implant.

Accordingly, in a particular aspect, the invention relates to an apparatus for simultaneous surgical placement of an intraoral bone graft and a dental implant in a subject in need thereof, said apparatus comprising a customized ridge augmentation matrix and one or more dental implant surgical drill guides, wherein the customized ridge augmentation matrix is custom configured to the subject's anatomy prior to the surgical placement to provide space maintenance for the intraoral bone graft; wherein the dental implant surgical drill guide comprises a drill port (also referred to herein as an "osteotomy access port") that can receive and guide an implant osteotomy drill and wherein the dental implant surgical drill guide may be articulated with and stably retained by the customized ridge augmentation matrix (CRAM) when used in the subject.

If necessary, the apparatus may also be further stabilized in the subject when used during the surgical placement of the intraoral bone graft and the dental implant in the subject through placement of the apical region of the dental implant surgical drill guide directly onto the subject's osseous crest, e.g., dentoalveolar ridge.

As used herein, the term "simultaneous surgical placement of an intraoral bone graft and a dental implant" refers to the ability to place both the dental implant and bone augmentation matrix in a subject at the same time, i.e., same clinical appointment. Specifically, the apparatus of the instant invention provides the ability to surgically place not only a bone graft and associated space-maintaining customized dental ridge augmentation matrix, but also to perform a guided implant surgical placement of one or more dental implants directly through the customized dental ridge augmentation matrix, without the need for teeth-borne or bone-level implant surgical guides, in a subject in a single clinical appointment.

Notwithstanding the foregoing, one of skill in the art will appreciate that in addition to surgery to place the bone graft materials, customized dental ridge augmentation matrix, and dental implant(s), the subject may need one or more pre-operative and/or post-operative clinical visits, including, e.g., pre-operative examinations of the subject's dental and medical health history, medical consults for existing medical conditions, one or more appointments for taking appropriate radiographic images and scans of the subject's anatomy in order to custom design and create the customized dental ridge augmentation matrix as well as one (or more than one, i.e., a graded series) dental implant surgical drill guides for integration therewith. Also, additional pre-operative and/or post-operative procedures may be necessary, e.g., to obtain intraoral or extraoral autogenous bone graft material (if bone allografts are not used); to prepare bone allografts, resorbable or non-resorbable membranes, and any other required biologics where indicated, and/or to follow up on the status of the subject's post-operative healing, etc.

The Customized Ridge Augmentation Matrix:

The apparatus of the instant invention comprises a customized ridge augmentation matrix which is designed based on the subject's anatomy to allow for the sufficient augmentation of the subject's dentoalveolar ridge, and to allow for placement of a dental implant in the subject. See FIG. 1. As used herein, the terms "customized ridge augmentation matrix", "CRAM", "dental ridge augmentation matrix", "matrix" and like terms may be used interchangeably and refer to a surgical space-maintaining device that is placed in a subject's mouth to facilitate use of a bone graft for increasing horizontal and/or vertical bone dimensions through guided bone regeneration, e.g., for promoting an increase in dentoalveolar ridge dimensions to support the placement of dental implants.

As understood herein, in the context of the instant invention, "space-maintaining" refers to providing a matrix that defines the designated shape for the bone cells to remodel and mature into bone structure underneath the matrix, thus creating ample bone for implant placement and stabilization.

In a particular embodiment, the customized dental ridge augmentation matrix of the apparatus of the instant invention comprises a configuration comprising first and second lateral wings extending downward from an apex, and comprising an interior surface defining a cavity suitable for placement over the dentoalveolar ridge of a subject and thus provide space-maintenance for a bone graft placed on the dentoalveolar ridge of a subject.

In a particular embodiment, at least a portion of the CRAM comprises a plurality of porous openings. Such porous openings are also referred to herein as "ports" or "pores." The number, size, and location of porous openings on the CRAM may be designed by one of skill in the art to serve a variety of purposes in the apparatus. For example, one or more porous openings on a CRAM may serve as: nutrient ports; places for integrating dental implant surgical drill guides; fixation screw ports; bone graft fill ports; and/or implant access ports. Several different ports of this type are depicted in the accompanying figures, and are discussed below in detail. The porous openings may be the same size, or of various different sizes. In a particular embodiment, the porous openings may range in size from about 1.0 mm to about 9.0 mm in diameter.

The CRAM may comprise one or more pores which serve as nutrient ports which provide the means for necessary biological fluids to access the surgical site in the subject. Specifically, such nutrient pores permit the passage of various substances and fluids through the matrix, including biological fluids and substances, e.g., growth factors and other biological molecules, which can stimulate and/or support bone regeneration in the graft site under the matrix. As contemplated herein, the nutrient ports may be of various sizes and designs. In one embodiment, these nutrient ports are discrete holes in the CRAM ranging in diameter from about 1.0 mm to about 9.0 mm. In a particular embodiment, nutrient ports in the CRAM may range from about 1.0 mm to about 3.0 mm in diameter. In another particular embodiment, nutrient ports in the CRAM may range from about 3.0 mm to about 9.0 mm in diameter. The CRAM may comprise numerous nutrient ports, and they may be located in any portion of the CRAM. It is contemplated herein that if required, nutrient ports in the CRAM may also serve as screw fixation ports and thus allow placement of one or more fixation screws to provide added stability. Thus, an added advantage of providing numerous nutrient ports in the CRAM is the ability to use them to place one or more additional fixation screws in different places through the CRAM for added stability if deemed necessary during oral surgery.

In addition to the foregoing, it is contemplated herein that the location and dimensions of one or more porous openings in the CRAM may be designed to serve as a means to integrate the dental implant surgical drill guide with the CRAM in the apparatus. For example, the dental implant surgical drill guide may be designed to comprise one or more means for attaching to the CRAM by locking into one or more porous openings in the CRAM. For example, in a particular embodiment, the dental implant surgical drill guide may comprise one or more pin-shaped projections which may be inserted into one or more corresponding pores in the CRAM, thus providing a means for integrating the dental implant surgical drill guide with the CRAM in the apparatus.

It is understood herein that after the dental implant surgical drill guide is removed, pores which previously served as ports for articulating the dental implant surgical drill guide with the CRAM during surgery may also serve as nutrient ports to facilitate bone growth in the subject.

In addition, the CRAM may also comprise one or more porous openings which serve as fixation screw ports. One of skill in the art will appreciate that such ports may be strategically located in the CRAM and designed to receive fixation screws for securing and stabilizing the CRAM to the subject's osseous anatomy. For example, in a particular embodiment, the lateral wings of the CRAM may comprise one or more fixation screw ports. In another particular embodiment, one or more fixation screw ports may be located at the external margins of the CRAM. In various embodiments, fixation screw ports in the CRAM may vary in size. In a particular embodiment, they may range from about 1.0 mm-3.0 mm in diameter.

The CRAM may also comprise one or more porous openings which serve as bone graft fill ports. These ports may be used to place bone graft materials within the CRAM, and in various embodiments may vary in size. In a particular embodiment, they may range from about 2.0 mm to about 6.0 mm in diameter. In a particular embodiment, one or more bone graft fill ports may be located at the buccal aspect of the customized dental ridge augmentation matrix.

Figure 5:
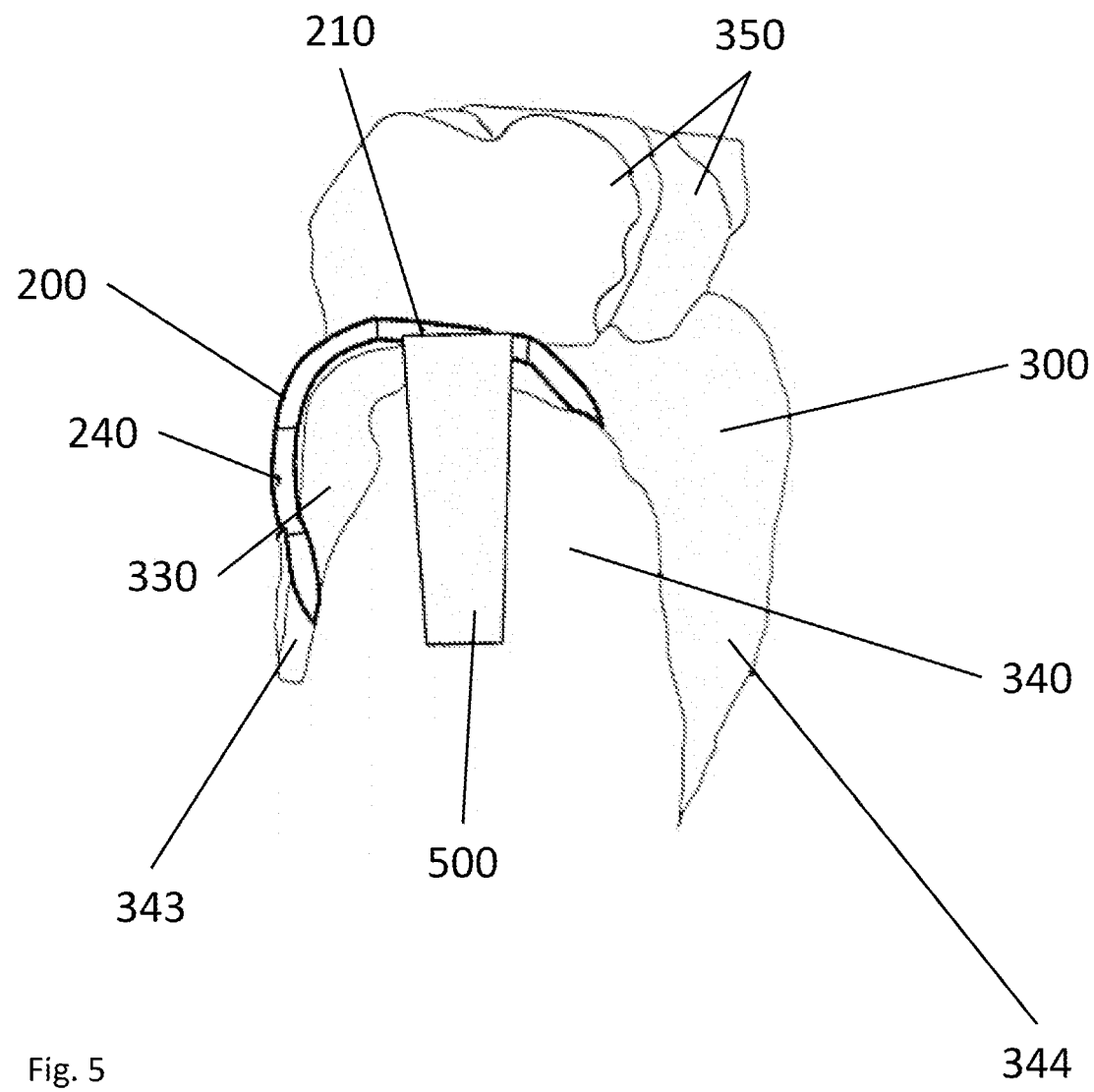
FIG. 5 depicts a coronal view of the CRAM 200 placed on the alveolar ridge 340 of the mandible 300 of a subject with a dental implant 500 in place through the dental implant surgical drill guide access port 210 of the CRAM 200. Teeth 350 and an area of bone augmentation 330 under the CRAM 200 adjacent to a bone graft fill port 240 are also depicted. Also depicted are the buccal surface of the alveolar ridge (343), and the lingual surface of the alveolar ridge (344).
Figure 6:
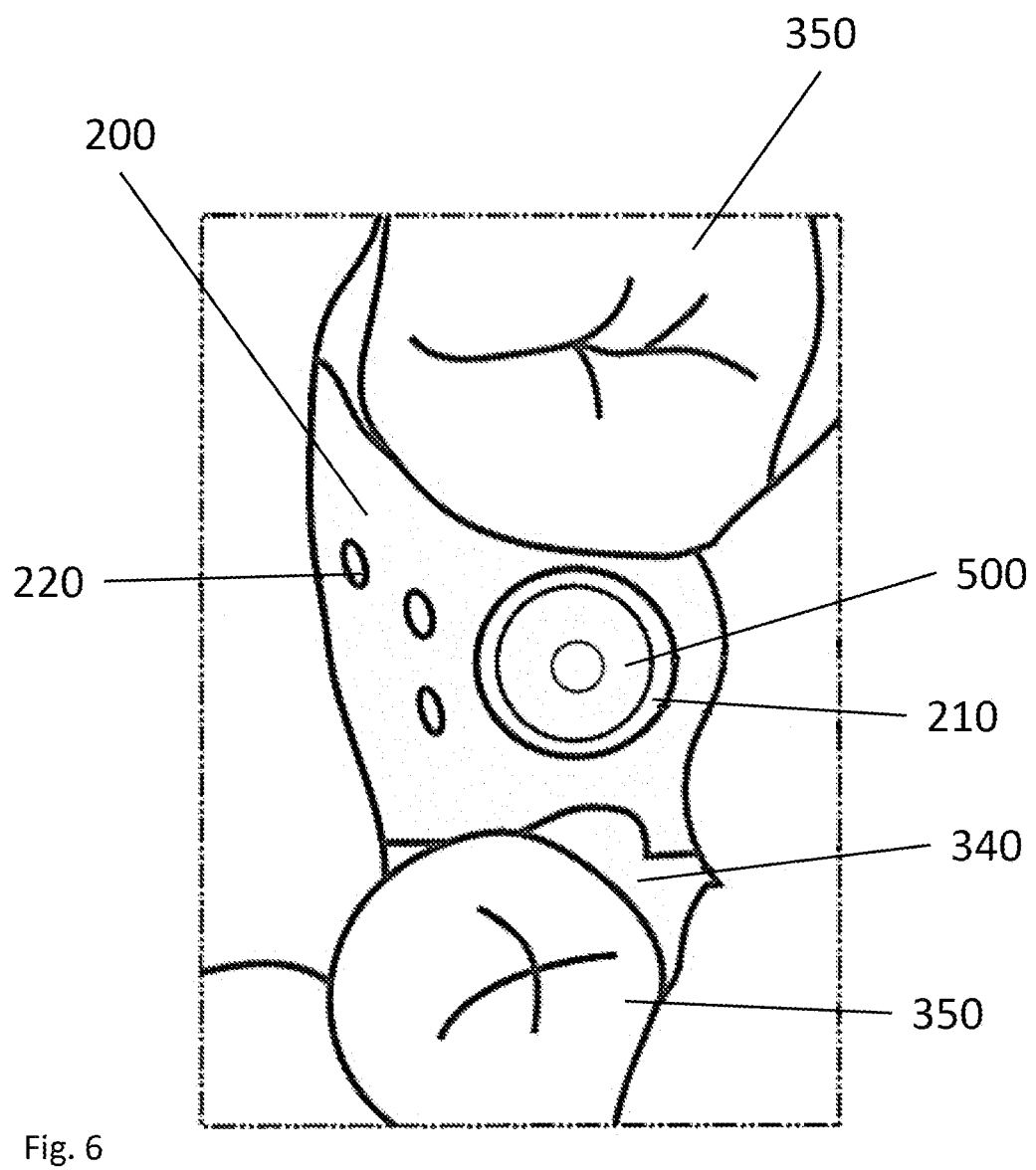
FIG. 6 depicts an occlusal view of the CRAM 200 of the invention in a subject with an implant 500 in place. Also depicted are implant access ports 210 and nutrient pores 220 of the CRAM 200, alveolar ridge 340 and teeth of the subject 350.

In a particular embodiment, one or more of said plurality of porous openings in the CRAM may serve as an implant access port. See, e.g., FIG. 5 and FIG. 6. Notably, it is contemplated herein that in the apparatus of the instant invention, the implant access port of the CRAM is designed to receive a dental implant and can also simultaneously allow for placement of a dental implant surgical drill guide(s), thus removing the need for conventional tooth-borne dental implant surgical drill guides. In a particular embodiment, the implant access port(s) are located at the coronal aspect of the customized ridge augmentation matrix. In a particular embodiment, dental implants for use with the apparatus and methods of the instant invention range from about 2.5 mm to about 6 mm in size, and it is contemplated herein that at least a 2-3 mm clearance is required to fit a dental implant surgical drill guide. Thus, in various embodiments, the implant access port(s) of the CRAM of the instant invention may range from about 3.0 mm to about 9.0 mm in diameter.

It is further contemplated herein that an implant access port can also serve as a bone graft fill port, especially for providing bone graft material to the lingual portions of the customized dental ridge augmentation matrix. See FIG. 1, which depicts an implant access port 210 on the CRAM 200 which allows for unique placement of the dental implant surgical drill guide(s) 400, but can also act as a bone graft fill port into which bone graft can be placed into the surgical site, thus augmenting the bone graft fill ports 240.

In a particular embodiment, it is contemplated herein that a customized ridge augmentation matrix of the apparatus of the instant invention may be custom designed and fabricated for a precision fit with the subject's anatomy at the site of the bone graft/dental implant. In a particular embodiment, the CRAM is designed based on the anatomy of the subject, e.g., the subject's dentoalveolar ridge, and fabricated using conventional methods prior to the surgical placement of the intraoral bone graft and dental implant in a subject. The terms "dentoalveolar ridge", "alveolar ridge", and "ridge" are familiar to one of skill in the art and are used interchangeably herein.

In a particular embodiment, the matrix is designed based on a subject's computerized tomography/cone beam computed tomography (CT/CBCT) scan, and prefabricated (3D printed, milled) and made available to the clinician before the surgery. Specifically, in a particular embodiment, the CRAM is made by first reconstructing the CT/CBCT scan using commercially available software, and a stereolithography (STL) file of boney geometry is created. The desired bone growth is then modeled on top of the original model. Once this is complete, the matrix is modeled on top of the desired bone growth. This process is described in detail below.

As understood herein, "prior to the surgical placement", "prior to the subject's surgical procedure", and like terms can be any suitable length of time, e.g., days, weeks, or even months before the surgical placement or procedure. It is also contemplated herein that adjustments in conformation of the apparatus (e.g., CRAM and/or dental implant surgical drill guides) may be made as necessary during the implant surgery.

As discussed above, in a particular embodiment, the configuration of the customized dental ridge augmentation matrix comprises an interior surface defining a cavity suitable to fit over an intraoral bone graft in the subject. In a particular embodiment, the customized ridge augmentation matrix comprises one or more lateral wings extending downward from an apex, and comprising an interior surface defining a cavity suitable to fit over said intraoral bone graft in said subject. In a particular embodiment, the lateral wings may comprise one or more porous opening, including but not limited to one or more fixation screw ports. See e.g., FIG. 3. It is contemplated herein that during a dental surgical implant procedure, the customized dental ridge augmentation matrix will be fixed on the dentoalveolar ridge using fixation screws according to conventional methods. Fixation screws suitable for use with the matrix of the instant invention are familiar to one of skill in the art and include but are not limited to commercially available screws such as 1.5 mm diameter PROFIX fixation screws (Osteogenics, Lubbock, Tex.), 1.5 mm diameter KLS fixation screws (Martin LP, Jacksonville, Fla.), and Salvin 1.5 mm or 2.0 mm diameter fixation screw (Salvin Dental Specialties, Charlotte, N.C.). Suitable fixation screws for use with the apparatus of the instant invention may also be custom designed using conventional methods. One of skill in the art will appreciate that the number of fixation screws used for this purpose can vary; typically no more than 6-8 fixation screws are necessary when placing implants in an entire dental arch. As discussed above, however, additional fixation screws may be used if deemed necessary by repurposing one or more additional porous openings in the CRAM to receive the fixation screws.

The customized dental implant surgical drill guide(s) may be secured on the CRAM using one or more corresponding structural features on the CRAM and the dental implant surgical drill guide that provide the means for integration of these two components of the apparatus. In a particular embodiment of the apparatus, integration may be achieved by inserting pin-shaped projections or "design pins" on the dental implant surgical drill guides into one or more porous openings in the CRAM. See, e.g., FIG. 2 and FIG. 3.

In another particular embodiment, the CRAM and dental implant surgical drill guides may be attached by designing the margins of the dental implant surgical drill guide to integrate with the coronal contours of the CRAM at the coronal extent, and/or with the dentoalveolar ridge at the apical extent of the guide. Thus, the drill guide can be designed to conform to both the CRAM and the ridge crest. Indeed, stabilization of the apparatus in the subject may be provided by custom configuring the dental implant surgical drill guide to allow intimate contact between the apical surface of the customized dental implant surgical drill guide and the osseous crest in the subject. See, e.g., FIG. 1, FIG. 3 and FIG. 4. Thus, it is contemplated herein that the CRAM provides a precision fit in the subject not only because the CRAM is fixed to provide space maintenance on the subject's deficient dentoalveolar ridge, but also because the dental implant surgical drill guides may also be stably integrated into the CRAM at the coronal extent and can conform to the underlying surface of the dentoalveolar ridge at the apical extent.

Dental Implant Surgical Drill Guide System:

As one of skill in the art will appreciate, dental implant surgical drill guides are used in dental implant procedures in order to prepare osteotomies for correctly guiding the depth, angle, and diameter of drilling during the implant procedure. Such dental implant surgical drill guides ensure that anatomic structures such as the sinus or inferior alveolar nerve of the subject are avoided during the surgical procedure. It is contemplated herein that multiple implant drill guides can be designed for use with the CRAM of the instant invention, and for multiple implant sites, if needed.

In one embodiment, the apparatus of the instant invention comprises the CRAM integrated with one or more dental implant surgical drill guide(s) during the preparation of the necessary implant osteotomies. Indeed, one of skill in the art will appreciate that typically, multiple osteotomies are made to expand the implant osteotomy to the proper diameter. For example, conventional methods may comprise starting from 2 mm using a 2 mm twist drill and expanding to 5 mm using an implant quad shaping drill to allow placement of a 5 mm diameter implant. Thus, it is contemplated herein that a simultaneous surgical placement of an intraoral bone graft and a dental implant may be performed according to the methods of the instant invention using the apparatus, wherein the apparatus comprises a CRAM and further comprises a dental implant surgical drill guide system. As understood herein, a "dental implant surgical drill guide system" for use with the apparatus of the instant invention comprises a plurality of dental implant surgical drill guides, wherein each guide comprises a different diameter drill port and is thus designed to allow sequential placement of increasing diameter implant osteotomy drills during the surgical placement of an intraoral bone graft and a dental implant in a subject. Thus, as contemplated herein, according to the methods of the invention, the CRAM may be individually integrated with one dental implant surgical drill guide, or with more than one dental implant surgical drill guide of increasing diameter in a sequential fashion, during the preparation of one or more osteotomies during the surgical procedure. One of skill in the art will appreciate that the number of drill guides employed, and the diameter of the different drill ports used may vary as deemed clinically appropriate, and will depend on the quantity and size of osteotomies required for a particular surgical implant procedure.

As discussed above, the apparatus of the instant invention may also be envisioned as a dental implant surgical system for simultaneous surgical placement of an intraoral bone graft and a dental implant in a subject in need thereof, said system comprising a customized ridge augmentation matrix and one or a plurality of dental implant surgical drill guides as provided in the various embodiments described herein. Accordingly, such terms are both used herein to describe and claim the instant invention.

It is contemplated herein that the dental implant surgical drill guides of the instant invention may be designed with a specific diameter, and off-set programmed to the desired implant drill system and patient's anatomy to allow proper surgical placement of an implant. As used herein, the term "off-set programmed" is understood to refer to the off-set, or vertical height designed in the drill guide that keeps the drill from penetrating the jaw too deeply, and thus ensures that the proper depth is drilled for the implant such that the implant will properly align with the surface of the ridge. Thus, it is understood that when articulated with and stably supported by the CRAM, each dental implant surgical drill guide is off-set programmed to be a certain proper set distance from the bone crest as designed for each specific implant drill system. The correct off-set can be determined by one of skill in the art.

One of skill in the art will appreciate that the diameter of the drill ports of the dental implant surgical drill guides for use in the apparatus of the instant invention may vary, and can be custom designed by one of skill in the art depending on the size of the implant drills to be used during the surgical procedure. Thus, the guides can be milled or printed to the customized dimensions of each sequential drill that may be employed in the preparation of a dental implant osteotomy.

In a particular embodiment, it is contemplated herein that the sequential dental implant surgical drill guides of the instant invention may be manufactured in a range of sizes compatible with conventional sequential osteotomy drill sizes. Thus, in one embodiment, the apparatus may comprise dental implant surgical drill guides comprising drill ports of about 2.0 mm to about 7.0 mm in diameter. In a particular embodiment, the drill port diameter ranges from about 2.5 mm-6.0 mm in diameter.

As one of skill in the art will appreciate, various osteotomy drills may be used with the apparatus and methods of the invention include, e.g., beginning with a 2.0 mm twist drill, and proceeding sequentially until arriving at the desired implant size using a quad shaping drill similar to the implant diameter. Implant diameters typically range from about 2.5 mm-6.0 min. For example, it is contemplated herein that, in a particular embodiment, a drill port at least 2 mm in diameter can be used to allow placement of a 2 mm twist drill. Where bone augmentation is required, and a 6 mm implant desired, as it is for some CRAM cases, a 7 mm drill guide could be used to allow for use of a 6 mm quad drill. Osteotomy drills are familiar to one of skill in the art and are available from a variety of commercial vendors.

It is also contemplated herein that the customized dental implant surgical drill guides of the instant invention can be designed for use with any commercially available dental implant system. For example, in a particular embodiment, the dental implant surgical drill guides may be manufactured in a graded series compatible with the drill sizes used with commercially available dental implant systems which have a set protocol defining a sequence of ascending diameter implant shaping drills. Thus, one of skill in the art will appreciate that the drill ports of the customized dental implant surgical drill guides of the instant invention may be designed for use with various implant systems dependent on their unique quad shaping drill sequence and drill sizes. This includes, but is not limited to, the BIOMET 3i OSSEOTITE CERTAIN implant system (BIOMET 3i, Palm Beach Gardens, Fla., USA). Thus, in one embodiment, suitable sequential drill guides for use with the instant invention may comprise 2.5 mm, 3.5 mm, and 4.5 mm diameter custom dental implant surgical drill guide port sizes, which allow sequential placement of 2.0 mm twist-drill, the 3.25 mm quad drill, and 4.0 mm quad shaping drills, respectively, for the 3i OSSEOTITE NT CERTAIN implant system.

In another embodiment, it is contemplated herein that a collar and/or sleeve system may be used with the methods and apparatus of the instant invention. These collars and sleeves are familiar to one of skill in the art and are commercially available in various dimensions and may be integrated in guided implant surgery systems to account for any off-set in implant osteotomy drill positions. It is contemplated herein that the apparatus of the instant invention can be adapted by one of skill in the art to include one or more custom made and/or commercially available collars or sleeves to account for any off-set in the implant osteotomy drill positions. Indeed, the apparatus of the instant invention can be integrated with various commercially available systems. For example, in one embodiment, it is contemplated herein that a custom configured dental implant surgical drill guide may be designed to receive a commercially available surgical guide spoon or sleeve that allows use of one or more implant osteotomy drills which are included with commercially available guided surgery kits. Such materials are available from a variety of commercial vendors, including but not limited to BIOMET 3i (Palm Beach Gardens, Fla.); Nobel BioCare (Kloten, Switzerland); and BioHorizons (Birmingham, Ala.).

Integration of Drill Guides and CRAM in the Apparatus:

As mentioned above, it is contemplated herein that the dental implant surgical drill guides and CRAM of the disclosed apparatus comprise structural features as a means for physically engaging and thus stably integrating the dental implant surgical drill guide(s) and the CRAM together in the apparatus for use during an oral surgical procedure. Indeed, it is contemplated herein that the physical integration of the dental implant surgical drill guides and the CRAM in the apparatus of the instant invention provides enhanced stability and thus greater precision drilling during a surgical implant procedure than prior art devices.

As understood herein, the structural features of the surgical drill guides and CRAM that provide means for integrating these components may be provided in any shape or manner which provides a suitable means of ensuring a stable physical connection between the matrix and the drill guide in the apparatus during a surgical procedure. Thus, in a particular embodiment, the CRAM and/or the dental implant surgical drill guide may be manufactured to comprise an intaglio surface, and one or more features of these intaglio surfaces may serve as one or more points of attachment designed to physically engage and stably integrate the dental implant surgical drill guides and the CRAM in the apparatus during use. As understood herein, an "intaglio surface" comprises structural features raised above the background plane of a surface, e.g., above the surface of the CRAM and/or the dental implant surgical drill guide in the apparatus of the instant invention.

Figure 2:
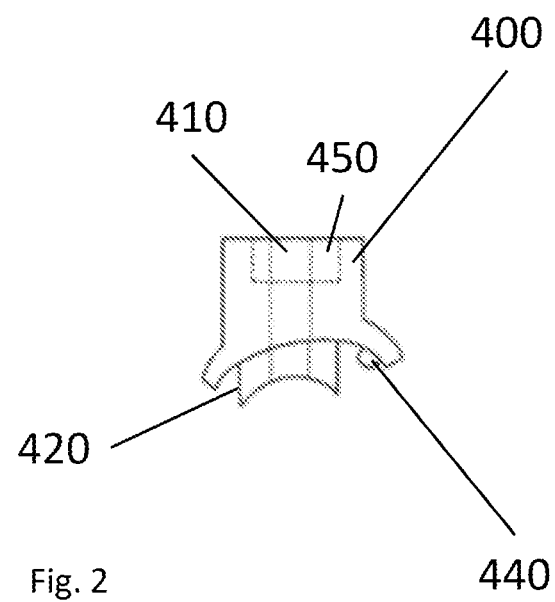
FIG. 2 depicts a coronal view of a dental implant surgical drill guide 400 of the instant invention comprising a drill port 410, margins 420, and a pin-shaped projection 440. Also depicted is space in the drill guide for a drill stopper 450.
Figure 3:
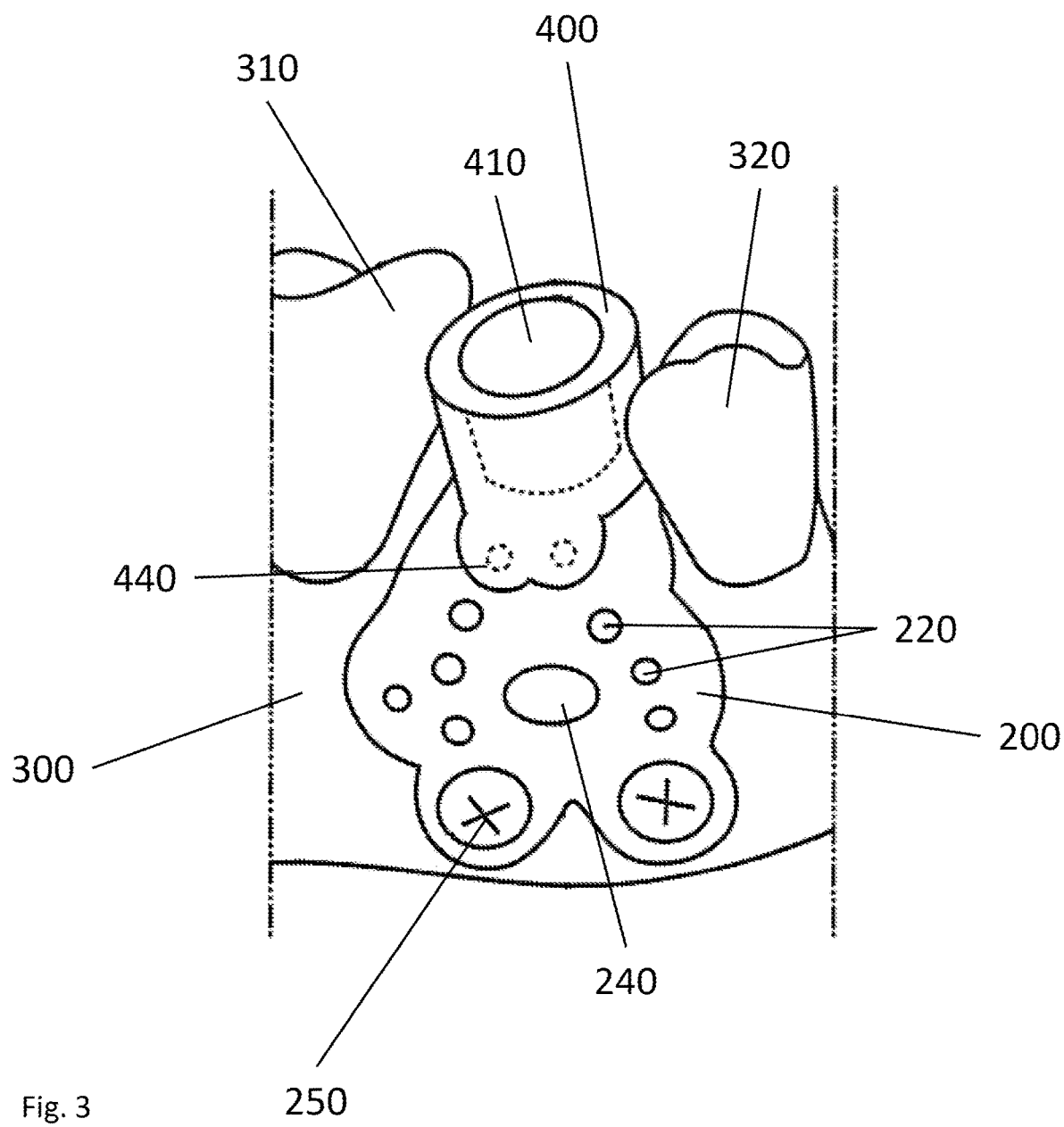
FIG. 3 depicts a buccal view of a dental implant surgical drill guide 400 placed in a customized ridge augmentation matrix (CRAM) 200. As depicted, the osteotomy and implant access port of the implant surgical drill guide 410 is aligned with the dental implant surgical drill guide access port of the CRAM (not visible) and the margins of the implant surgical drill guide inserted therein (not visible). The pin projections of the implant surgical drill guide 440 are inserted into corresponding ports in the CRAM (not visible), and fixation screws 250 are screwed into fixation screw ports in the CRAM (not visible) into the mandible 300. Also depicted in this figure are nutrient ports 220; bone graft fill port 240; molar tooth 310; and pre-molar tooth 320.
Figure 4:
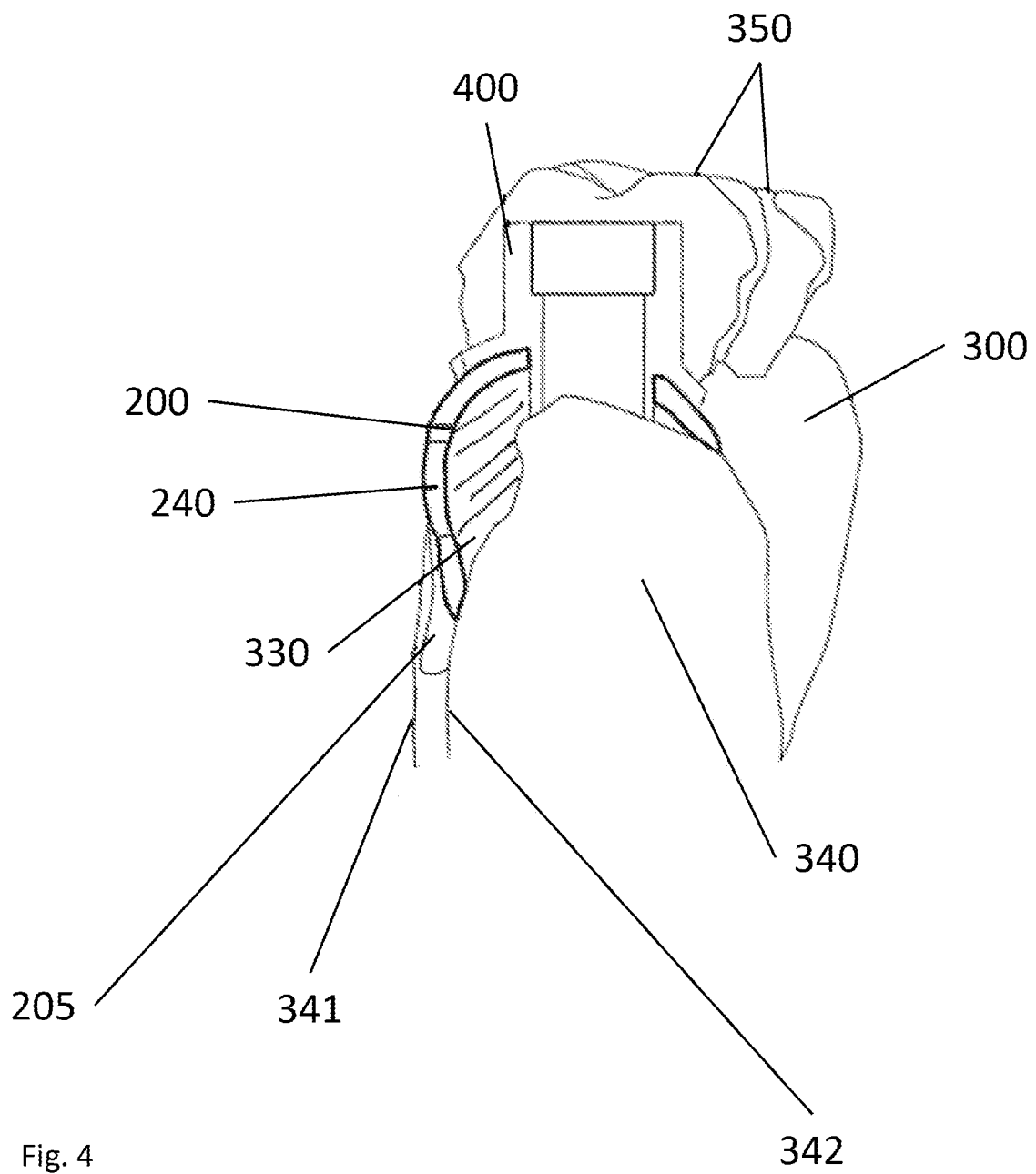
FIG. 4 depicts a coronal view of the CRAM 200 placed on the alveolar ridge 340 of the mandible 300 of a subject with a surgical drill guide 400 in place. Teeth 350 and an area of bone augmentation 330 under the CRAM 200 adjacent to a bone graft fill port 240 are also depicted. Also depicted are the posterior border of the alveolar ridge (341), the anterior border of the alveolar ridge (342), and the continuation of the CRAM, posteriorly and apically (205).

One of skill in the art will appreciate that these intaglio surfaces may be designed to have a variety of structural features which can provide sufficient means for articulating the dental implant surgical drill guide with the CRAM in the apparatus. In a particular embodiment, said one or more features include, but are not limited to, projections on a first intaglio surface that are capable of physically integrating with corresponding openings or recessions on a second surface. For example, in one embodiment, the CRAM/dental implant surgical drill guide may comprise one or more projections which may be inserted into corresponding porous openings in the dental implant surgical drill guide/CRAM designed as a means for stably attaching the CRAM and dental implant surgical drill guide in the apparatus during use. In a particular embodiment, the projections are pin-like in shape ("pins"). In a particular embodiment, the dental implant surgical drill guides comprise one or more pins for physically connecting the dental implant surgical drill guide to the CRAM, and the CRAM comprises one or more complementary channels or pores into which the pins on the dental implant surgical drill guide may be inserted. For example, FIG. 1 and FIG. 2 depict pins 440 projecting from the intaglio surface of the drill guide. In FIG. 3, the pins 440 are shown inserted into corresponding nutrient ports 220 in the CRAM 200 to achieve stabilization of the apparatus on the subject's mandible 300.

It is contemplated herein that the design of the pins and receiving channels or pores may be of any shape and dimension to permit a stable physical integration between the matrix and the dental implant surgical drill guides. In a particular embodiment, this may be achieved by designing the pins to be slightly smaller in diameter than the receiving channel or pore. In a particular embodiment, the diameter of the pins may range from about 0.5 mm-2 mm. It is contemplated herein that the pins/receiving channels may be circular in shape, but other shapes and geometric configurations are contemplated herein. One of skill in the art will appreciate that the length of the pins can vary depending on the geometry of the matrix; in a particular embodiment, the pin length does not extend past the matrix thickness. In a particular embodiment, the matrix thickness ranges from about one millimeter or less thick.

One or more corresponding structural features may be employed to provide a secure attachment between the CRAM and the dental implant surgical drill guide; in a particular embodiment only one structural point of attachment may be necessary to integrate the CRAM with a dental implant surgical drill guide. In other various embodiments, a plurality of structural features may be employed to provide integration. In a particular embodiment, the dental implant surgical drill guides of the instant invention may comprise a plurality of pins in a variety of different shapes and dimensions which permit integration with corresponding receiving structures on the CRAM. In a particular embodiment, 1, 2, 3, or 4 pins may be used.

In addition to the integration of one or more corresponding surface structural features, it is contemplated herein that the CRAM and dental implant surgical drill guides of the instant invention may be designed and fabricated in such a way that these components structurally interlock in the apparatus in other ways. For example, as discussed above, in a particular embodiment, the apical surface of a customized dental implant surgical drill guide may be designed and fabricated to closely adapt to or intimately conform to the coronal external surface of the customized dental ridge augmentation matrix. In another embodiment, the apical margins of the customized dental implant surgical drill guide may be fabricated to closely adapt to the underlying osseous crest. See, e.g., FIG. 4. It is contemplated herein that the design of the apparatus of the instant invention can provide sufficient integration and stabilization of the drill guide to the customized CRAM such that further conventional means of stabilizing a surgical drill guide, e.g., using adjacent teeth or ridge form, is not necessary. Indeed, tests of the apparatus show only limited, if any, mobility during use of the guide, and the implant was placed in the correct position.

Referring to the drawings, a particular embodiment of an apparatus of the instant invention is depicted in FIG. 1. Depicted is an isometric view of the apparatus of the instant invention 100 comprising a customized dental ridge augmentation matrix 200 installed on a section of mandible 300 with a customized dental implant surgical drill guide 400 illustrated above the customized dental ridge augmentation matrix 200. An osteotomy access port 410 is located at the apex of the dental implant surgical drill guide 400. As discussed above, the osteotomy access port 410 of the drill guides can be milled or printed to the customized dimensions of the drills of any proprietary or commercial dental implant system (not pictured) for use with the apparatus of the instant invention in the preparation of a dental implant osteotomy.

The margins of the dental implant surgical drill guide 420 are depicted in FIG. 1 and FIG. 2 and as discussed above, may be shaped to the contours of the CRAM 200 in order to allow the dental implant surgical drill guide 400 to be properly stabilized by the CRAM 200 alone, i.e., without the need to secure the drill guide to adjacent teeth, ridge form, or section of the subject's mandible 300 for stabilization. In addition, it is contemplated herein that the CRAM 200 may be contoured to the bony surface of the mandible 300 to provide added stabilization.

As discussed above, the dental implant surgical drill guides of the instant invention are designed and manufactured to control the angle and the depth of the drilling during an implant procedure. As depicted in FIG. 1, the contours of the underside of the dental implant surgical drill guide 430 may be designed to conform to the underlying osseous crest of the alveolar bone to allow for additional stability of the dental implant surgical drill guide 400. As discussed above, and depicted in FIG. 3, in one embodiment, a plurality of attachments in the form of pins 440 on the intaglio surface of the dental implant surgical drill guide 400 may be used to mount the dental implant surgical drill guide 400 to the CRAM 200. This ensures the dental implant surgical drill guide 400 is placed correctly on the CRAM 200 and provides an additional aspect of stability for the dental implant surgical drill guide 400 mounted on the CRAM 200.

Fixation of the Apparatus in the Oral Cavity:

The apparatus of the instant invention comprises one or more structural features that provide means for securing the apparatus to the subject's oral anatomy. As discussed above, in one embodiment, the CRAM is secured or fixed to the subject's osseous anatomy through fixation screws inserted into the dentoalveolar ridge while avoiding anatomic structures such as the sinus or inferior alveolar nerve.

It is contemplated herein that the dental implant surgical drill guides may comprise not only one or more structural features designed to physically engage and stably integrate with the customized dental ridge augmentation matrix, but also comprise one or more structural features which permit contact with the subject's underlying oral anatomy for additional surgical stability. As such, the design of the apparatus provides two levels of stabilization in the patient during surgery: through close integration with the customized dental ridge augmentation matrix fixed to the dentoalveolar ridge, and through contact with the dentoalveolar osseous crest immediately apical to the customized dental implant surgical drill guide. See, e.g., FIG. 3 and FIG. 4 which depict buccal and coronal views, respectively, of the dental implant surgical drill guide "sitting" on the ridge.

Specifically, in such apparatus, the apical aspect of the dental implant surgical drill guide may be designed to conform to the shape of the subject's osseous crest upon placement, allowing it to be stabilized with the CRAM by one or more pins and/or the margin coronally, and the osseous crest apically. This configuration removes the need for stabilization using adjacent teeth, and indeed, can provide stabilization in the absence of adjacent teeth for stabilization. It also removes the need for additional fixation of a bone-level surgical guide, which introduces additional surgical complexity and morbidity. Points of attachment also may be provided in the underside of the dental implant surgical drill guide. For example, it is contemplated herein that the underside of the drill guide may be elongated to increase the length of the drill guide, and thus provide additional accuracy for the surgical drill guides. In a particular embodiment, the contours of the underside of the drill guide can be custom designed to conform to the underlying osseous structure of the subject and thus provide yet another means to stabilize the CRAM. For example, the underside of the surgical drill guides may further comprise an apical area shaped in a manner to permit the guide to rest on the osseous crest and permit intra-operative stability during the preparation of implant drill osteotomies.

Intraoral Bone Grafts:

It is contemplated herein that biological materials suitable for stimulating guided bone regeneration may be surgically placed in a subject in need thereof using the apparatus of the instant invention. For example, ridge augmentation can be performed as a simultaneous one-stage procedure using a CRAM with simultaneous implant placement, or as a delayed two-stage procedure (CRAM placed first to augment the ridge prior to subsequent implant placement). The bone graft can be placed through one or more bone graft fill ports and/or directly through the implant access port if sufficient space allows for placement of graft material. One of skill in the art will appreciate that various clinical approaches may be taken to stimulate guided bone regeneration in a subject. For example, if ridge augmentation has been designed on the lingual aspect of the dentoalveolar ridge, then bone graft material can be placed on the lingual aspect first after fixation of the CRAM, but prior to implant placement to allow access to the lingual aspect of the customized dental ridge augmentation matrix.

Various kinds of bone graft materials familiar to one of skill in the art may be used with the methods and apparatus of the instant invention. For example, the types of grafts that may be used with this invention include, but are not limited to, bone autografts of the subject's own bone, allografts of bone graft material from tissue banks, e.g., fresh or fresh-frozen allografts, freeze-dried bone allografts (FDBA), or demineralized freeze-dried bone allografts (DFDBA), bone xenografts, bone alloplasts, and other biologics alone (e.g., enamel matrix derivative) or biologics in combination with a carrier matrix e.g., platelet derived growth factor (PDGF) in combination with the carrier, beta tricalcium phosphate ($\beta$-TCP), or recombinant human bone morphogenetic protein-2 (rhBMP-2) in combination with a carrier such as absorbable collagen sponge (ACS).

In a particular embodiment, alloplast synthetic bone graft materials familiar to one of skill in the art, e.g., alloplast synthetic bone graft materials comprising hydroxyapatite, calcium phosphate, surgical grade resins, and other materials may be used. In a particular embodiment of the instant invention, bone allografts are used with the apparatus of the instant invention. Bone allografts are available from a variety of commercial dental products companies, including, but not limited to LifeNet Health (Virginia Beach, Va.) and Straumann USA (Andover, Mass.). In another embodiment, bone xenografts are used, e.g., when bone autografts or bone allografts are not available or are not preferred for use in the subject. Such materials are available from a variety of commercial dental products companies, including, but not limited to a bone xenograft product BIO-OSS, available from Geistlich Pharma North America (Princeton, N.J.).

Dental Implants and Prosthetics, Bone Screws:

It is contemplated herein that various kinds of commercially available conventional dental implants and various restorative components including compatible implant abutments and restorations, may be used with the methods and apparatus of the instant invention. In addition to the foregoing materials, it is also contemplated herein that various kinds of conventional screws suitable for use with dental implants may be used with the apparatus of the instant invention. All these materials are familiar to one of skill in the art and may be obtained by a variety of commercial vendors, including but are not limited to, BIOMET 3i (Palm Beach Gardens, Fla.); Nobel BioCare (Kloten, Switzerland); BioHorizons (Birmingham, Ala.), and Straumann (Basel, Switzerland.)

Custom Fabrication of the Apparatus:

As discussed in detail below, the dental implant surgical drill guides of the apparatus of the instant invention may be designed and manufactured according to conventional methods. As contemplated herein, the apparatus of the instant invention may be custom fabricated not only to obtain a dental ridge augmentation matrix that fits properly in a subject's jaw, but also to develop surgical drill guides and an implant drilling strategy to ensure a successful oral surgical procedure for each subject.

Various conventional machines and bioengineering techniques may be used to custom design and fabricate the apparatus of the instant invention. For example, in a particular embodiment, a customized dental ridge augmentation matrix may be milled or printed using conventional methods, e.g., using electron beam melting techniques. Such techniques also include, e.g., dental milling or additive manufacturing using, e.g., computed axial tomography (CAT) imaging. In addition, careful measurements of a subject's anatomy may be made using cone beam computed tomography (CBCT) and 3D modeling. In a particular embodiment, it is contemplated herein that a subject may be scanned using conventional CBCT methods and the resulting image uploaded into computer-aided design (CAD) software to create a 3D model which can be used to custom design a customized dental ridge augmentation matrix with precise dimensions for that subject.

In a particular embodiment, it is contemplated herein that methods for designing and fabricating the apparatus of the instant invention may comprise the use of CBCT guided surgery and computer-aided design/computer-assisted manufacture (CAD/CAM). Such techniques of additive manufacturing technology may be used to virtually augment atrophic mandibular ridges. The virtual design can allow for the increase of alveolar ridge width to meet the anticipated need for dental implant placement while reducing surgical time. This technology allows enhanced treatment planning for guided bone regeneration and prevents the need to cut, bend, adapt, preoperatively shape, or piece together commercially available titanium mesh membranes. For example, CBCT data may be used to fabricate a titanium matrix using an additive process. It is contemplated herein that, in a particular embodiment, custom matrices such as these may be created and used as dental ridge augmentation matrices in the apparatus and methods of the instant invention.

It is also contemplated herein that digital and additive manufacturing methods may be used. For example, a 3D reconstruction of a subject's current bony geometry may be acquired by importing CBCT images into biomedical software such as, e.g., MATERIALISE MIMICS (Materialise, Plymouth, Mich. USA), thresholding for the bony tissue, and exporting a stereolithography (STL) file. The STL file may be manufactured on a STL machine, e.g., a SLA 7000, (3D Systems, Rock Hill, S.C. USA) to produce a physical 3D model. The digital mandible STL the may then be imported into a 3D engineering design and sculpting tool set, e.g., GEOMAGIC FREEFORM MODELING PLUS (3D Systems, Rock Hill, S.C. USA) to digitally smooth any surface imperfections due to the CBCT scan. The mandible file may be used primarily as a reference. A separate additional digital body file may be created to represent a rough estimate of the ideal bony formation clinically desired. This augmentation is then digitally molded to produce the exact desired volume, shape, and contours of bony formation to increase the osseous crest for future implants. This structure may then be used to create a thin, solid overlay of the desired bone flush with the borders of the mandible. In a particular embodiment, the structure may be approximately 0.5 mm thick. In other embodiments, it may be from about 0.65 mm-0.8 mm thick. Porous openings such as fixation, fill, and nutrient ports, and other mesh holes may be added. The final design may then be manufactured using an electron beam melting system, e.g., on an Arcam A1 Electron Beam Melting Machine (Arcam AB, Mölndal, Sweden) from a biocompatible metal including, but not limited to titanium and/or a titanium alloy. The matrix may be depowdered, cleaned, and polished with a rotary tool; screw holes may be countersunk; and the mesh blasted with alumina and glass heads to obtain a smooth surface finish. Fit of the customized matrix may be tested and verified on a STL mandible model.

It is contemplated herein that one or more components of the apparatus of the instant invention may comprise one or more biocompatible materials. As understood herein, a "biocompatible material" refers to a material that is not harmful to living tissue. Biocompatible materials are familiar to one of skill in the art and include a wide variety of commercially available medical grade materials. These include but are not limited to materials such as plastic, titanium, zirconia, acrylic, and a combination or alloy thereof.

In a particular embodiment, biocompatible materials for use in fabricating the apparatus of the instant invention include the titanium alloy, Ti6AlV4 and substructure grade zirconia. As understood herein, "substructure grade zirconia" is a hard grade form of zirconia familiar to one of skill in the art. Biocompatible materials for fabrication of the apparatus disclosed herein may be obtained from a variety of commercial vendors familiar to one of skill in the art. These include, for example, Arcam AB (Mölndal, Sweden); AP&C Advanced Powders and Coatings, Inc. (Boisbriand, Quebec, Canada); EOS (Novi, Mich., USA); Concept Laser, Inc. (Grapevine, Tex., USA); 3D Systems (Rock Hill, S.C., USA).

Similarly, customized dental implant surgical drill guides, including a graded series of customized dental implant surgical drill guides, may be made specifically for use with the customized CRAM disclosed herein according to the methods of the instant invention. Custom made collars and spoons for use with the methods and apparatus of the instant invention are also contemplated herein.

One of skill in the art will appreciate that CRAMS and dental implant surgical drill guides for use with the apparatus and methods of the instant invention can be designed to fit any of the available conventional guided implant surgery osteotomy and shaping drills, as tong as the internal diameter of the guide allows passage of the implant osteotomy and shaping drills. This includes, e.g., guided surgery kits by BIOMET 3i (Palm Beach Gardens, Fla.); Nobel BioCare (Kloten, Switzerland); and BioHorizons (Birmingham, Ala.).

Methods of Using the Apparatus:

It is contemplated herein that by employing the apparatus of the instant invention, a matrix for providing space maintenance for guided bone regeneration may be placed in a subject during the same surgical procedure in which a dental implant is inserted in the jaw of the subject. After each osteotomy or shaping drill sequence (as guided by the customized dental implant surgical drill guide), corresponding directional indicators familiar to one of skill in the art can be used to assess the osteotomy direction prior to implant placement.

In a particular aspect, the invention relates to a method of simultaneously surgically placing an intraoral bone graft and a dental implant in a subject in need thereof, said method comprising use of the apparatus or system disclosed herein.

In a particular embodiment, the invention relates to a method of simultaneously surgically placing an intraoral bone graft and a dental implant in a subject in need thereof, said method comprising:

a. creating a customized ridge augmentation matrix for the subject based on the subject's anatomy prior to the subject's surgical procedure;

b. creating one or more custom configured dental implant surgical drill guides for the subject based on the subject's anatomy and desired restoration prior to the subject's surgical procedure;

c. placing the customized ridge augmentation matrix into the subject during the subject's surgical procedure;

d. individually integrating said one or more custom configured dental implant surgical drill guides with the customized ridge augmentation matrix, and preparing one or more implant osteotomies in the subject comprising using said one or more custom configured dental implant surgical drill guides during the subject's surgical procedure;

e. placing a dental implant into said one or more implant osteotomies through the implant access port of the customized ridge augmentation matrix during the subject's surgical procedure;

f. placing one or more bone grafts in the subject through one or more ports of the customized ridge augmentation matrix during the subject's surgical procedure; and g. surgically closing the site of said intraoral bone graft and dental implant in the subject at the end of the subject's surgical procedure.

In a particular embodiment, one or more bone grafts may be placed through one or more bone graft fill ports and/or through the implant access port of the CRAM during the subject's surgical procedure.

As understood herein, "simultaneously" refers to placing the CRAM and placing the dental implant during the same surgical procedure. In a particular embodiment, bone graft material is placed in the subject during the same procedure.

In a particular embodiment, it is contemplated herein that the method may comprise creating, and then sequentially individually integrating a plurality of custom configured dental implant surgical drill guides during the subject's surgical procedure, wherein said plurality of custom configured dental implant surgical drill guides each comprises a different diameter drill port designed to allow sequential placement of increasing diameter implant osteotomy drills to create an osteotomy in the subject during the subject's surgical procedure. As understood herein, when more than one custom configured dental implant surgical drill guide is to be used during a subject's surgical procedure, each guide is used in turn, e.g., in a sequential fashion according to the size of the drill guide. After being used in the subject's surgical procedure, each guide is removed from the customized ridge augmentation matrix. As discussed above, it is contemplated herein that the individual components used in such procedure as part of the apparatus of the invention may together be referred to herein as a dental implant surgical system.

The method of the invention may further comprise covering the customized ridge augmentation matrix and dental implant with a biocompatible barrier membrane, e.g., prior to closing. Membranes suitable for such use are familiar to one of skill in the art and include a wide variety of resorbable, non-resorbable, and synthetic membranes. Resorbable membranes include, but are not limited to, membranes comprising biological materials, e.g., collagen, amnion-chorion, dura mater; as well as synthetic materials such as polylactic acid, polyglycolic acid, citric acid esters, and bioresorbable polymers and co-polymers such as polylactic acid-polyglycolic acid (PLLA-PGA) co-polymers. Non-resorbable membranes include materials such as expanded polytetrafluoroethylene (ePTFE) and polytetrafluoroethylene (PTFE). Such membranes, as well as other materials and dental surgical techniques associated with the implant procedures discussed herein are familiar to one of skill in the art. See, e.g., Rodella, L. et al., Int. J. Biomed. Sci. Vol. 7, No. 2 June, 2011 the entire contents of which are incorporated by reference herein.

Although the invention herein has been described with reference to particular embodiments, it is to be understood that these embodiments, and examples provided herein, are merely illustrative of the principles and applications of the present invention. It is therefore to be understood that numerous modifications can be made to the illustrative embodiments and examples, and that other arrangements can be devised without departing from the spirit and scope of the present invention as defined by the appended claims. All patent applications, patents, literature and references cited herein are hereby incorporated by reference in their entirety.

EXAMPLES

The data in the below example provides proof of concept; i.e., that a customized dental implant surgical drill guide may be directly stabilized by a customized dental ridge augmentation matrix and underlying osseous structure using the apparatus and methods of the instant invention to perform guided implant surgery, and without relying on stabilization from adjacent teeth or the use of an additional bone level surgical guide.

Example 1

Case Report

A titanium CRAM and dental implant surgical drill guide of the instant invention was made for a patient requiring a dental implant. During oral surgery, the CRAM and articulated dental implant surgical drill guide worked to stably guide the dental implant in the patient. Notably, only limited, if any, mobility occurred during use of the guide, and the implant was placed in the correct position. Unfortunately, the patient experienced flap dehiscence (opening up of the flap). With flap dehiscence, a bone graft is likely lost. Thus, to prevent possible implant infection, the CRAM was removed to allow the soft tissue (gingiva) to heal over the implant and keep it healthy.

While guided bone regeneration was not successfully achieved in this patient, the combined use of the integrated CRAM and dental implant surgical drill guide was successful. Moreover, because the patient did not absolutely require the bone augmentation, the implant was eventually successful.

What is claimed is:

1. A dental implant surgical system for simultaneous surgical placement of an intraoral bone graft and a dental implant in a subject in need thereof, said system comprising a customized ridge augmentation matrix and one or a plurality of dental implant surgical drill guides, wherein the customized ridge augmentation matrix is custom configured to the subject's anatomy prior to the surgical placement to provide space maintenance for the intraoral bone graft and wherein at least a portion of the customized ridge augmentation matrix comprises a plurality of porous openings; wherein one or more of said plurality of porous openings is a bone graft fill port; wherein said one or a plurality of dental implant surgical drill guides comprise a drill port that can receive and guide an implant osteotomy drill; wherein the one or a plurality of dental implant surgical drill guides may be articulated with and stably retained by the customized ridge augmentation matrix in the subject, and wherein each of said plurality of dental implant surgical drill guides comprises a different diameter drill port designed for sequential placement of increasing diameter implant osteotomy drills during the simultaneous surgical placement of the intraoral bone graft and the dental implant in the subject in need thereof.

2. The dental implant surgical system of claim 1 wherein said plurality of porous openings range in size from about 1.0 mm to about 9.0 mm in diameter.

3. The dental implant surgical system of claim 1 wherein one or more of said plurality of porous openings are selected from the group consisting of porous openings that can serve as points of articulation with the one or a plurality of dental implant surgical drill guides, fixation screw ports, implant access ports, and nutrient ports.

4. The dental implant surgical system of claim 3 wherein said fixation screw ports are designed to receive screws for securing the customized ridge augmentation matrix to the subject's osseous anatomy.

5. The dental implant surgical system of claim 3 wherein said fixation screw ports are located on lateral wings of the customized ridge augmentation matrix.

6. The dental implant surgical system of claim 3 wherein said points of articulation are designed to receive pin-shaped projections on the dental implant surgical drill guide.

7. The dental implant surgical system of claim 3 wherein said points of articulation also serve as nutrient ports.

8. The dental implant surgical system of claim 3 wherein said implant access ports are located at a coronal aspect of the customized ridge augmentation matrix.

9. The dental implant surgical system of claim 1 wherein the drill port of the one or a plurality of dental implant surgical drill guides is about 2 mm to about 7 mm in diameter.

10. The dental implant surgical system of claim 1 wherein the one or a plurality of dental implant surgical drill guides are off-set programmed to a desired implant drill system.

11. The dental implant surgical system of claim 1 wherein said one or a plurality of dental implant surgical drill guides comprise an intaglio surface, and wherein one or more structural features of said intaglio surface are designed to physically engage and stably integrate the one or a plurality of dental implant surgical drill guides at one or more of said plurality of porous openings on said customized ridge augmentation matrix.

12. The dental implant surgical system of claim 11 wherein said one or more structural features of said intaglio surface comprise one or more pin-shaped projections designed to physically insert into said one or more of said plurality of porous openings on said customized ridge augmentation matrix.

13. The dental implant surgical system of claim 12 wherein said one or more pin-shaped projections are less than about 2.0 mm in length and/or diameter.

14. The dental implant surgical system of claim 12 wherein said one or more pin-shaped projections are about 0.5 mm-2.0 mm in length and/or diameter.

15. The dental implant surgical system of claim 12 wherein said one or more of said plurality of porous openings on said customized ridge augmentation matrix are points of articulation that also serve as nutrient ports.

16. The dental implant surgical system of claim 1 wherein the one or a plurality of dental implant surgical drill guides comprise a margin around the one or a plurality of dental implant surgical drill guides that conforms to the coronal contour of the customized ridge augmentation matrix to provide stable integration therewith.

17. The dental implant surgical system of claim 1 wherein said one or a plurality of dental implant surgical drill guides are custom configured to comprise one or more structural features designed to contact the osseous anatomy of the subject to provide enhanced stability of the dental implant surgical drill guide system in the subject.

18. The dental implant surgical system of claim 1 wherein the dental implant surgical system comprises one or more biocompatible materials.

19. The dental implant surgical system of claim 18 wherein the one or more biocompatible material is selected from the group consisting of plastic, titanium, zirconia, zirconium oxide, acrylic, and a combination or alloy thereof.

20. The dental implant surgical system of claim 19 wherein the alloy is Ti6AlV4.

21. The dental implant surgical system of claim 19 wherein the zirconia is substructure grade zirconia.

22. A method of simultaneously surgically placing one or more intraoral bone grafts and a dental implant in a subject in need thereof, said method comprising use of the dental implant surgical system of claim 1, and wherein said one or more intraoral bone grafts are placed through one or more of said plurality of porous openings.

23. The method of claim 22 wherein the method further comprises covering the customized ridge augmentation matrix and the dental implant with a biocompatible membrane prior to closing.

24. The method of claim 23 wherein the biocompatible membrane is resorbable.

* * * * *